(12) United States Patent　　(10) Patent No.: US 6,626,283 B2
McBride　　(45) Date of Patent: Sep. 30, 2003

(54) PULLEY PLUNGER ASSEMBLY

(75) Inventor: William E. McBride, Tulsa, OK (US)

(73) Assignee: Lockheed Martin Corporation, Bethesda, MD (US)

( * ) Notice: Subject to any disclaimer, the term of this patent is extended or adjusted under 35 U.S.C. 154(b) by 97 days.

(21) Appl. No.: 09/797,673

(22) Filed: Mar. 5, 2001

(65) Prior Publication Data

US 2002/0121425 A1 Sep. 5, 2002

(51) Int. Cl.[7] .............................................. B65G 15/12
(52) U.S. Cl. ................................................. 198/626.6
(58) Field of Search ..................................... 198/626.6

(56) References Cited

U.S. PATENT DOCUMENTS

| | | | | |
|---|---|---|---|---|
| 2,372,646 A | * | 4/1945 | Barnby et al. ............ | 198/626.6 |
| 3,262,545 A | * | 7/1966 | Worsencroft ............. | 198/626.6 |
| 3,459,289 A | * | 8/1969 | Roseman ................. | 198/464.3 |
| 3,521,322 A | * | 7/1970 | Michael et al. ............ | 452/177 |
| 3,802,549 A | * | 4/1974 | Kinsey .................... | 198/404 |
| 3,882,995 A | * | 5/1975 | Uraya ..................... | 198/626.6 |
| 3,951,257 A | * | 4/1976 | Storace et al. ........... | 198/626.6 |
| 4,929,809 A | * | 5/1990 | Aso et al. ................ | 219/69.12 |
| 5,343,279 A | | 8/1994 | Nagata et al. | |
| 5,896,979 A | | 4/1999 | Hokari et al. | |
| 5,899,321 A | | 5/1999 | El-Ibiary | |
| 5,964,339 A | | 10/1999 | Matsuura et al. | |
| 6,296,107 B1 | * | 10/2001 | Baumgartner-Pichelsberger ........... | 198/626.6 |

* cited by examiner

Primary Examiner—Joseph A. Dillon
(74) Attorney, Agent, or Firm—Schwartz & Weinrieb

(57) ABSTRACT

A conveyor system for conveying pieces or units of mail, or similar articles, comprises a fixed side and a movable side. The fixed side comprises a first conveyor belt which has a first inner run section partially defining an article flow path and which is routed around a plurality of pulleys which have their axes fixed with respect to the article flow path. The movable side comprises a second conveyor belt which has a second inner run section cooperating with the first inner run section of the first conveyor belt so as to cooperate therewith in defining the article flow path and which is routed around a plurality of pulleys or wheels which are movable with respect to the article flow path so as to accommodate the conveyance of different articles, having different thickness dimensions, along the article flow path.

20 Claims, 6 Drawing Sheets

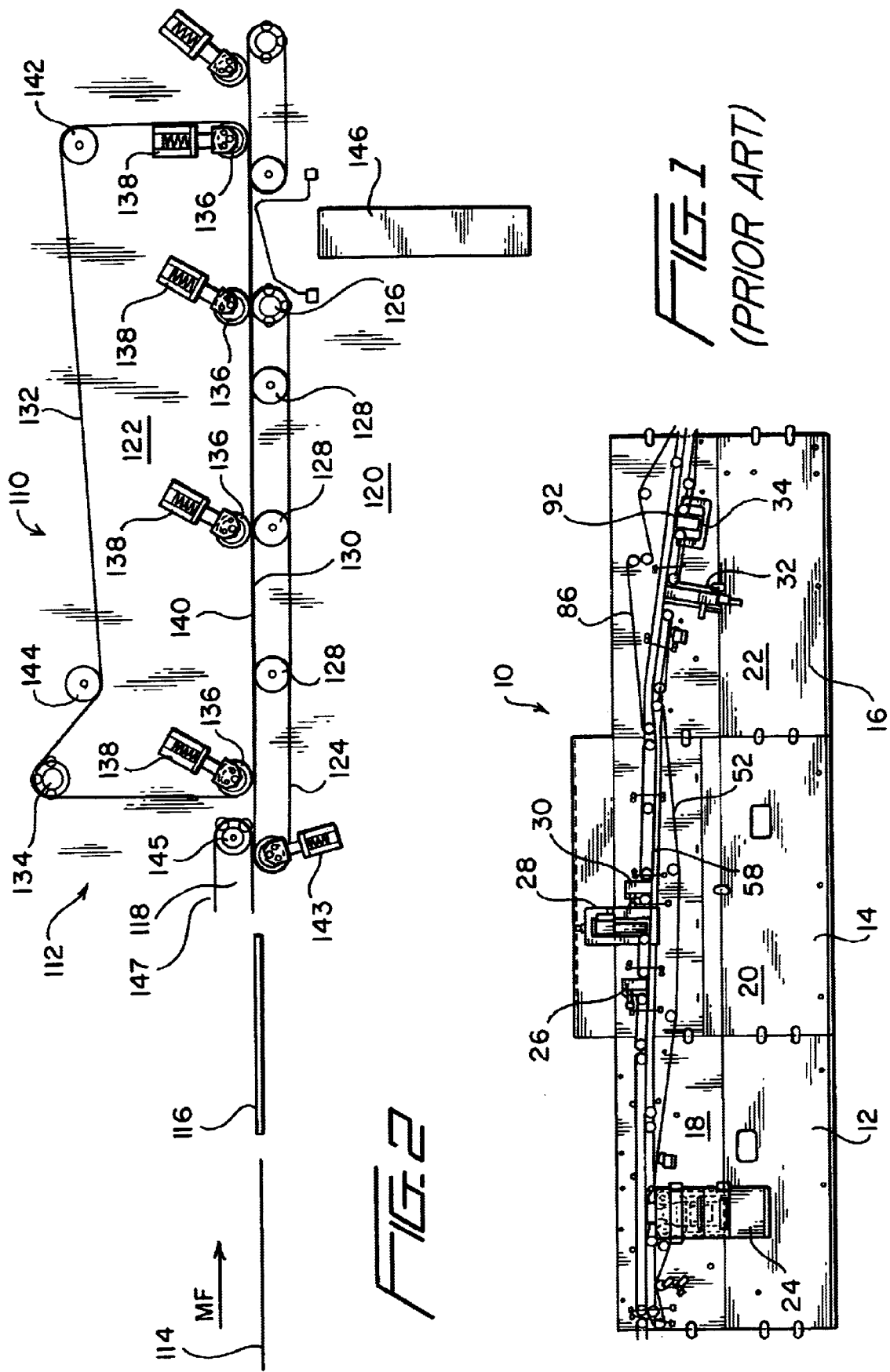

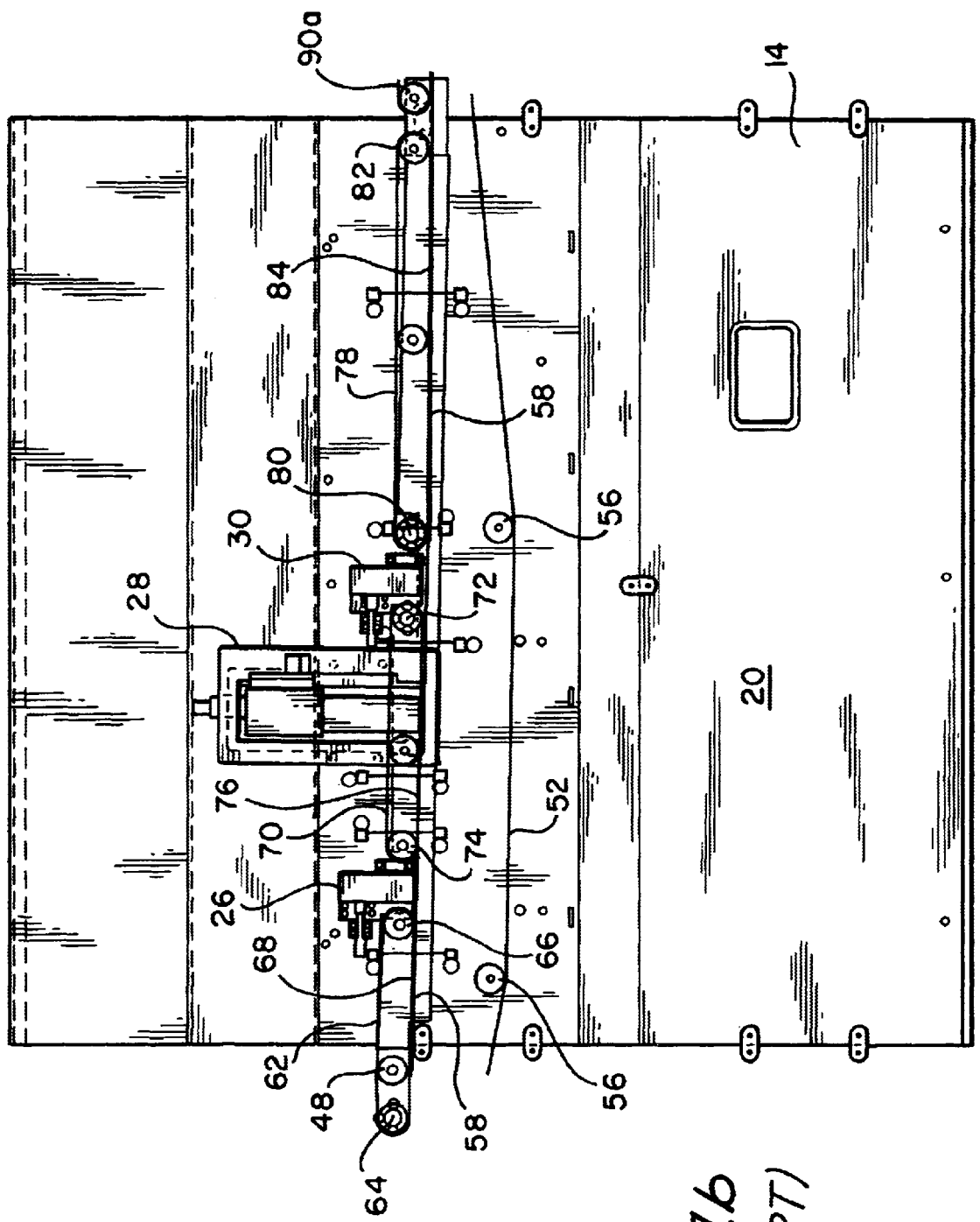

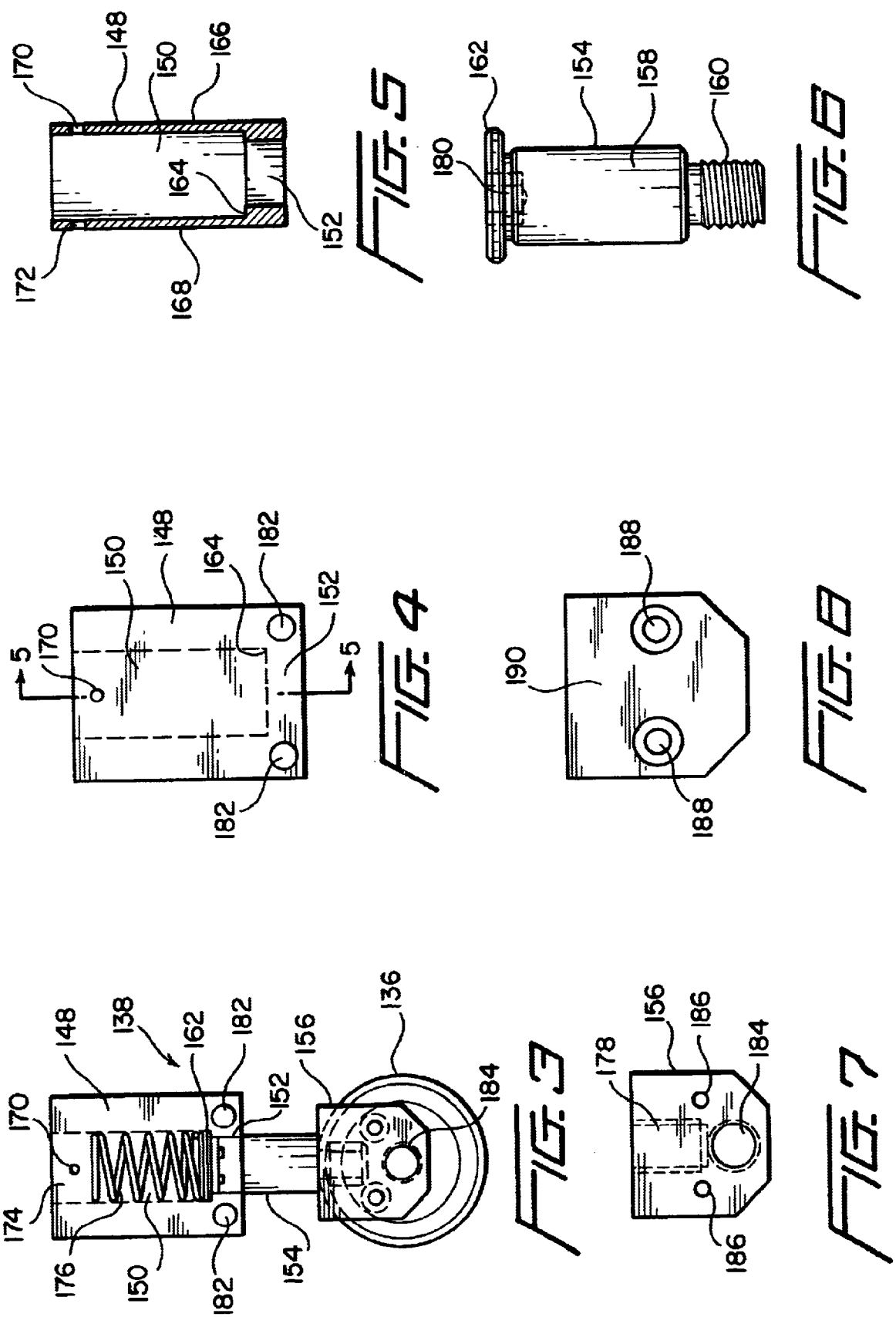

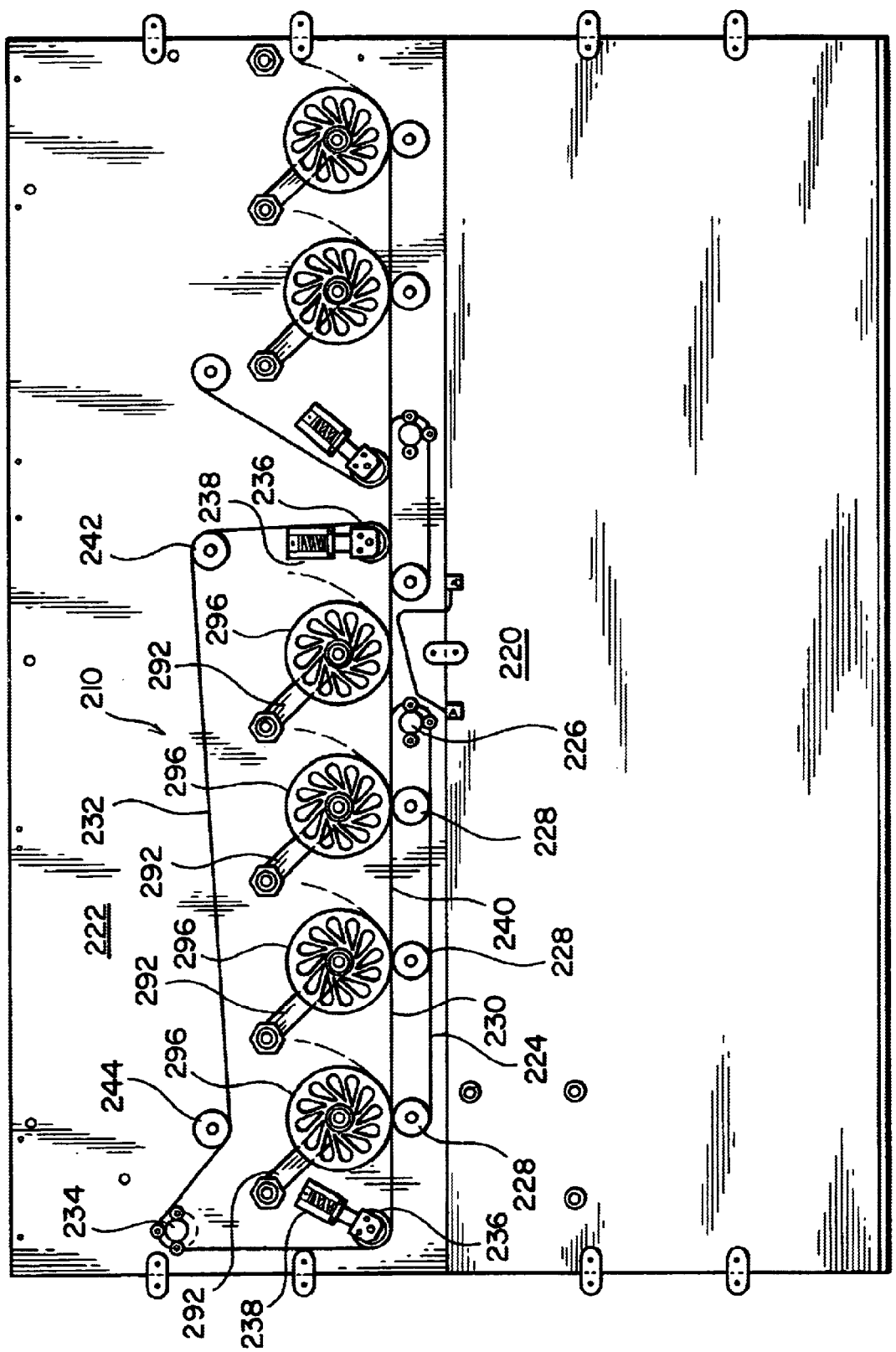

PULLEY PLUNGER ASSEMBLY

FIELD OF THE INVENTION

The present invention relates generally to article conveying or transporting systems, and more particularly to a new and improved system for use within, for example, mail, or similar article, handling, transporting, and sorting systems, wherein relatively flat pieces or units of mail, or similar articles, having different thickness dimensions, can nevertheless be properly, rapidly, and efficiently handled, transported, and sorted without becoming damaged as a result of the conveyance or transportation of the pieces or units of mail, or similar articles, through the various conveying or transporting stages of the system, and without causing jamming of the system which would obviously necessitate an undesirable operational shutdown of the conveyor system while maintenance personnel perform necessary maintenance and repairs in order to effectively unjam or unblock the system and return the same to online operational status.

BACKGROUND OF THE INVENTION

In connection with handling, transporting, and sorting systems which are used for the high-speed processing of mail or similar articles, the pieces or units of mail, or similar articles, are conventionally conveyed by means of conveyor systems which normally comprise a plurality of conveyor belts or conveyor belt subsystems wherein individual sections or runs thereof are oppositely disposed with respect to each other such that the conveyed pieces or units of mail, or similar articles, are interposed between the oppositely disposed conveyor belt sections so as to be conveyed downstream by means of the cooperating conveyor belts. The subsystems further comprise a drive motor and driven pulleys operatively connected to the drive motor, and are designed so as to be capable of transporting or conveying different pieces or units of mail, or similar articles, which may have relatively different thickness dimensions. In accordance with such conventional conveyor subsystems, one of the sections or runs of a first one of the two oppositely disposed conveyor belt subsystems extends between or spans two conveyor pulleys which are longitudinally spaced from each other at opposite ends of the particular conveyor belt section or run, and in this manner, that section or run of the first one of the conveyor belts is free to flex or bow away from the oppositely disposed section or run of the second one of the two oppositely disposed conveyor belt subsystems so as to in effect accommodate the conveyance of pieces or units of mail, or similar articles, which have a relatively large thickness dimension. This can be better appreciated from drawing FIGS. 1 and 1a–1c wherein FIG. 1 discloses three sections of a conventional mail or article conveyor, while FIGS. 1a–1c are enlarged views of the three sections shown in FIG. 1. More particularly, FIG. 1 discloses a conventional mail or article conveyor system which is generally indicated by the reference character 10, and the conveyor system 10 is seen to comprise three upstream sections 12, 14, 16. Units or pieces of mail, or similar articles, are adapted to be conveyed through the three upstream sections 12, 14, 16 of the conveyor system 10 in a vertical or upstanding mode between the two oppositely disposed sections or runs of the conveyor belt subsystems, as will become more apparent shortly hereafter, wherein the unites or pieces of mail, or similar articles, are conveyed in an edgewise mode upon base members or deck components 18, 20, 22 of the sections 12, 14, 16, and after passing through the third conveyor section 16, the units or pieces of mail, or similar articles, are conveyed into and through a turnover section, not shown, wherein the pieces or units or mail, or similar articles, are now adapted to be conveyed in a flat surface mode. The conveyor section 12 may have one or more cameras 24 operatively associated therewith, while conveyor section 14 may include a reader component 26, a printer 28, and a verifier 30. Section 16 may likewise comprise a printer 32 and a reader 34.

More importantly, however, for the purposes of the present invention, it is further seen that, in connection with the conveyor belt arrangement within the first conveyor section 12 of the conventional conveyor system 10, a first inner one of the two oppositely disposed conveyor belt subsystems is seen to comprise a first inner conveyor belt 36 which is driven by means of a drive pulley 38 and which is also routed around a plurality of idler pulleys 40 such that a substantially planar section or run 42 of conveyor belt 36 defines an upstream portion of the mail or article conveying path. In a similar manner, a second outer one of the two oppositely disposed conveyor belt subsystems is seen to comprise a first outer conveyor belt 44 which is driven by means of a drive pulley 46 and which is also routed around an idler pulley 48 such that a substantially planar upstream section or run 50 of conveyor belt 44 is disposed opposite the planar section or run 42 of conveyor belt 36 so as to cooperate therewith in defining the aforenoted upstream portion of the mail or article conveying path.

In a similar manner, as can be further seen from FIG. 1a and with additional reference being made to FIGS. 1b and 1c, the first inner one of the two oppositely disposed conveyor belt subsystems is seen to comprise a second inner conveyor belt 52 which is adapted to be driven by means of a drive pulley 54 as shown in FIG. 1c and which is also routed around a plurality of idler pulleys 56 such that a substantially planar section or run 58 of conveyor belt 52 defines an intermediate portion of the mail or article conveying path. It is further appreciated that a downstream section or run 60 of first outer conveyor belt 44 is disposed opposite the planar section or run 58 of conveyor belt 52 so as to cooperate therewith in partially defining the aforenoted intermediate portion of the mail or article conveying path. Continuing still further, the second outer one of the two oppositely disposed conveyor belt subsystems is seen to also comprise a second outer conveyor belt 62 which is driven by means of a drive pulley 64 and which is also routed around an idler pulley 66 such that a substantially planar section or run 68 of conveyor belt 62 is disposed opposite the planar section or run 58 of conveyor belt 52 so as to cooperate therewith in also partially defining the aforenoted intermediate portion of the mail or article conveying path. Continuing still yet further, the second outer one of the two oppositely disposed conveyor belt subsystems is seen to additionally comprise a third outer conveyor belt 70 which is driven by means of a drive pulley 72 and which is also routed around an idler pulley 74 such that a substantially planar section or run 76 of conveyor belt 70 is likewise disposed opposite the planar section or run 58 of conveyor belt 52 so as to also cooperate therewith and thereby partially define the aforenoted intermediate portion of the mail or article conveying path.

Lastly, the second outer one of the two oppositely disposed conveyor belt subsystems is seen to also comprise a fourth outer conveyor belt 78 which is driven by means of a drive pulley 80 and which is also routed around an idler pulley 82 such that a substantially planar section or run 84 of conveyor belt 78 is likewise disposed opposite the planar section or run 58 of conveyor belt 52 so as to also cooperate therewith and thereby partially define the aforenoted intermediate portion of the mail or article conveying path. It can thus be appreciated that, particularly in connection with the mail or article conveying path defined, for example, by means of the conveyor belt 52 and the opposed conveyor belts 44, 62, 70, and 78, and as may best be appreciated from FIGS. 1 and 1a–1c, the overall configuration of the conveyor belt 52 is substantially that of an archery-bow or a triangle wherein the planar section or run 58 of the conveyor belt 52 freely extends between the extreme left idler roller 56 as seen in FIG. 1a and the drive pulley 54 as shown in FIG. 1c. Accordingly, it is to be understood and appreciated that when pieces or units of mail, or similar articles, having relatively large thickness dimensions are conveyed along the aforenoted flow path by means of the various conveyor belts, the planar section or run 58 is free to flex, bow, or move away from the conveyor belts 44, 62, 70, and 78 in order to effectively accommodate the transportation or conveyance of such pieces or units of mail or articles having such relatively large thickness dimensions.

In a similar manner, with reference being specifically made to FIG. 1c, it is seen that, in connection with the downstream portion or section of the flow path for the conveyed pieces or units of mail, or similar articles, the outer conveyor belt subsystem comprises a single conveyor belt 86 which is driven by means of a drive pulley 88 and which is also routed around a plurality of idler pulleys 90, including oppositely disposed upstream and downstream idler pulleys 90a, 90b which are disposed at the extreme ends of the expanse of the conveyor belt 86. Accordingly, it is again seen, in a manner similar to that of conveyor belt 52, that the conveyor belt 86 has an overall configuration which is that of a triangle or archery-bow, and therefore, still further, it is additionally seen that the conveyor belt 86 includes a substantially planar section or run 92 which is disposed along the mail or article flow path. In conjunction with conveyor belt 86, and more particularly, in conjunction with substantially planar mail or article flow path section or run 92, the inner conveyor belt downstream end subsystem comprises a first conveyor belt 94 which is driven by means of a drive pulley 96 and which is also routed around an idler pulley 98 whereby, as a result of the disposition of such conveyor belt 94, there is provided a substantially planar section 100 of conveyor belt 94 which is disposed opposite substantially planar section 92 of conveyor belt 86 so as to cooperate therewith in partially defining the downstream portion of the mail or article flow path.

In a similar manner, the inner conveyor belt downstream end subsystem is seen to further comprise a second conveyor belt 102 which is driven by means of a drive pulley 104 and which is also routed around an idler pulley 106 whereby, as a result of the disposition of such conveyor belt 102, there is provided a substantially planar section 108 of conveyor belt 102 which is disposed opposite substantially planar section 92 of conveyor belt 86 so as to cooperate therewith in partially defining the downstream portion of the mail or article flow path. Lastly, in a likewise similar manner, the inner conveyor belt downstream end subsystem is seen to still further comprise a third conveyor belt 110 which is driven by means of a drive pulley 112 and which is also routed around at least one idler pulley 114 whereby, as a result of the disposition of such conveyor belt 110, there is provided a substantially planar section 116 of conveyor belt 110 which is also disposed opposite substantially planar section 92 of conveyor belt 86 so as to cooperate therewith, as well as with conveyor belt sections 100 and 108, in partially defining the downstream portion of the mail or article flow path.

While the aforenoted conventional or prior art mail or similar article conveying system is normally operationally satisfactory, it has been experienced that, as a result of the particular or specific design of such systems, it is often difficult or problematic for the system to continuously, smoothly, and reliably convey or transport those pieces or units of mail, or similar articles, which have relatively large thickness dimensions. The reason for this can be best appreciated from the schematic illustration of FIGS. 1 and 1a–1c. As was noted hereinbefore, the mail or article flow path comprises substantially planar conveyor belt elongated sections 58 and 92. Accordingly, when a substantially thick piece or unit of mail, or similar article, is to be conveyed along the mail or article flow path, the conveyor belt sections 58 and 92 will have to bow or flex away from their respective oppositely disposed conveyor belt sections 60, 68, 76, 84 and 100, 108, 116 in order to permit the piece or unit of mail, or similar article, having the relatively large thickness dimension to be conveyed. The degree or amount of flexure or bowing of the conveyor belt sections 58 and 92 is limited, however, to the flexibility or the degree to which the conveyor belt can stretch. It is to be remembered further, however, that the conveyor belts are normally maintained substantially taut or under a relatively high degree of tension in order to in fact be capable of performing their cooperative functions in transporting or conveying the pieces or units of mail or similar articles. If the conveyor belts cannot flex or bow to a sufficiently large degree, then the system will likely become jammed or blocked when pieces or units of mail, or similar articles, having relatively large thickness dimensions, are attempted to be conveyed or transported through the system. Accordingly, such conventional or prior art systems are effectively limited in their abilities to convey or transport pieces or units of mail, or similar articles, which have thickness dimensions which are greater than a predetermined amount. In addition, the pieces or units or mail, or similar articles, may be damaged within the system, and still further, maintenance or repair personnel must of course be summoned to unjam or unblock the system whereby, obviously, the system experiences operational downtime.

A need therefore exists in the art for a new and improved system for use within, for example, mail, or similar article, handling, transporting, and sorting systems, wherein relatively flat pieces or units of mail, or similar articles, having different thickness dimensions, can nevertheless be continuously, efficiently, and reliably handled, transported, and sorted without becoming damaged as a result of the conveyance or transportation of the pieces or units of mail, or similar articles, through the various conveying or transporting stages of the system, and without causing jamming of the system which would obviously necessitate undesirable operational downtime of the conveyor system while maintenance personnel perform necessary maintenance and repairs in order to effectively unjam or unblock the system and return the same to online operational status.

OBJECTS OF THE INVENTION

Accordingly, it is an object of the present invention to provide a new and improved mail or similar article handling, transporting, and sorting system.

Another object of the present invention is to provide a new and improved mail or similar article handling, transporting, and sorting system which effectively overcomes the various drawbacks and operational disadvantages characteristic of prior art mail or article handling, transporting, and sorting systems.

An additional object of the present invention is to provide a new and improved mail or similar article handling, transporting, and sorting system which effectively overcomes the various drawbacks and operational disadvantages characteristic of prior art mail or article handling, transporting, and sorting systems wherein pieces or units of mail, or similar articles, having different thickness dimensions can nevertheless be continuously, efficiently, and reliably handled, transported, and sorted by means of the system of the present invention.

A further object of the present invention is to provide a new and improved mail or similar article handling, transporting, and sorting system which effectively overcomes the various drawbacks and operational disadvantages characteristic of prior art mail or article handling, transporting, and sorting systems wherein the system effectively comprises a fixed conveyor side and a movable conveyor side so as to accommodate pieces or units of mail, or similar articles, having different thickness dimensions whereby such pieces or units of mail, or similar articles, having such different thickness dimensions, can be continuously, efficiently, and reliably handled, transported, and sorted without undergoing damage and without jamming or blocking the system.

SUMMARY OF THE INVENTION

The foregoing and other objectives are achieved in accordance with the teachings and principles of the present invention through the provision of a new and improved mail or similar article handling, transporting, and sorting system which comprises, in effect, a fixed conveyor side and a movable conveyor side. The fixed conveyor side of the system comprises a plurality of belt conveyors wherein the conveyor belts are driven by means of a drive pulley and wherein further the conveyor belts are routed around a plurality of idler pulleys which have their rotational axes fixed with respect to the plane of the mail or article flow path. The movable side of the system likewise comprises a plurality of belt conveyors wherein the conveyor belts are likewise driven by means of a drive pulley and wherein further the conveyor belts are routed around a plurality of idler pulleys. However, in accordance with the unique and novel principles and teachings of the present invention, the idler pulleys incorporated within the movable side of the conveyor belt system are mounted either upon spring-biased plunger mechanisms or swing arm devices so as to, in effect, be retractable away from the plane of the mail or article flow path. In this manner, a linear or substantially planar flow path is maintained, and various pieces or units of mail, or similar articles, having different thickness dimensions, can be accommodated within the conveyor system. It is to be particularly appreciated that the system is therefore virtually unlimited in connection with the particular pieces or units of mail, or similar articles, which can be handled, transported, or conveyed by the system because the only criteria which would effectively limit the system in connection with the handling, transporting, or conveying of a particular unit or piece of mail, or similar article, would be the thickness dimension of such article, however, the system can be readily implemented or tailored so as to accommodate particular pieces or units of mail, or similar articles, having predetermined thickness dimensions, by providing the plunger mechanisms with predetermined longitudinal strokes, or by providing the swing arm devices with pivotal ranges of motion having predetermined arcuate extents.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a top plan view showing three conveyor sections of a conventional or PRIOR ART system currently being used to handle, transport, or convey pieces or units of mail, or similar articles, having different thickness dimensions;

FIG. 1b is an enlarged detailed view of the second conveyor section of the PRIOR ART system disclosed within FIG. 1;

FIG. 2 is a schematic plan view of a first embodiment of a new and improved mail or article conveyor system developed in accordance with the teachings and principles of the present invention and showing the cooperative parts thereof defining the fixed and movable sides thereof;

FIG. 3 is a partially schematic, front elevational view of a spring-biased plunger mechanism assembly used in connection with the movable side of the conveyor system shown in FIG. 2;

FIG. 4 is a front elevational view of the plunger body component used within the spring-biased plunger mechanism assembly shown in FIG. 3;

FIG. 5 is a cross-sectional view of the plunger body shown in FIG. 4 as taken along the lines 5—5 of FIG. 4;

FIG. 6 is a front elevational view of the threaded stud component used within the spring-biased plunger mechanism assembly shown in FIG. 3;

FIG. 7 is a front elevational view of the plunger head component used within the spring-biased plunger mechanism assembly shown in FIG. 3;

FIG. 8 is a front elevational view of the slider component used within the spring-biased plunger mechanism assembly shown in FIG. 3, and FIG. 9 is a schematic plan view similar to that of FIG. 1 showing, however, a second embodiment of a new and improved mail or article conveyor system developed in accordance with the teachings and principles of the present invention and showing the cooperative parts thereof defining the fixed and movable sides thereof.

DETAILED DESCRIPTION OF THE ILLUSTRATED EMBODIMENTS

Figure 1A:
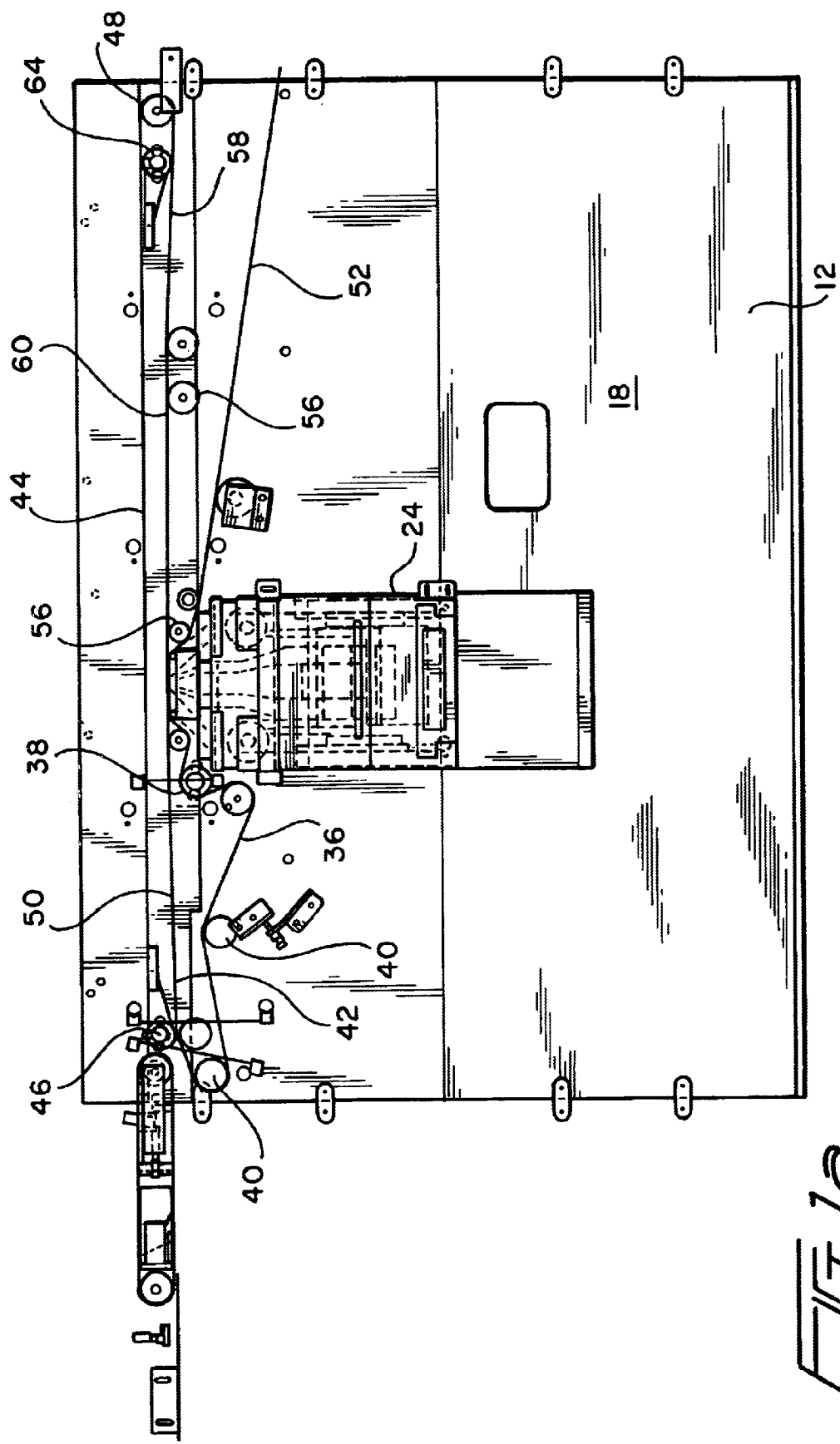
FIG. 1a is an enlarged detailed view of the first conveyor section of the PRIOR ART system disclosed within FIG. 1.
Figure 1C:
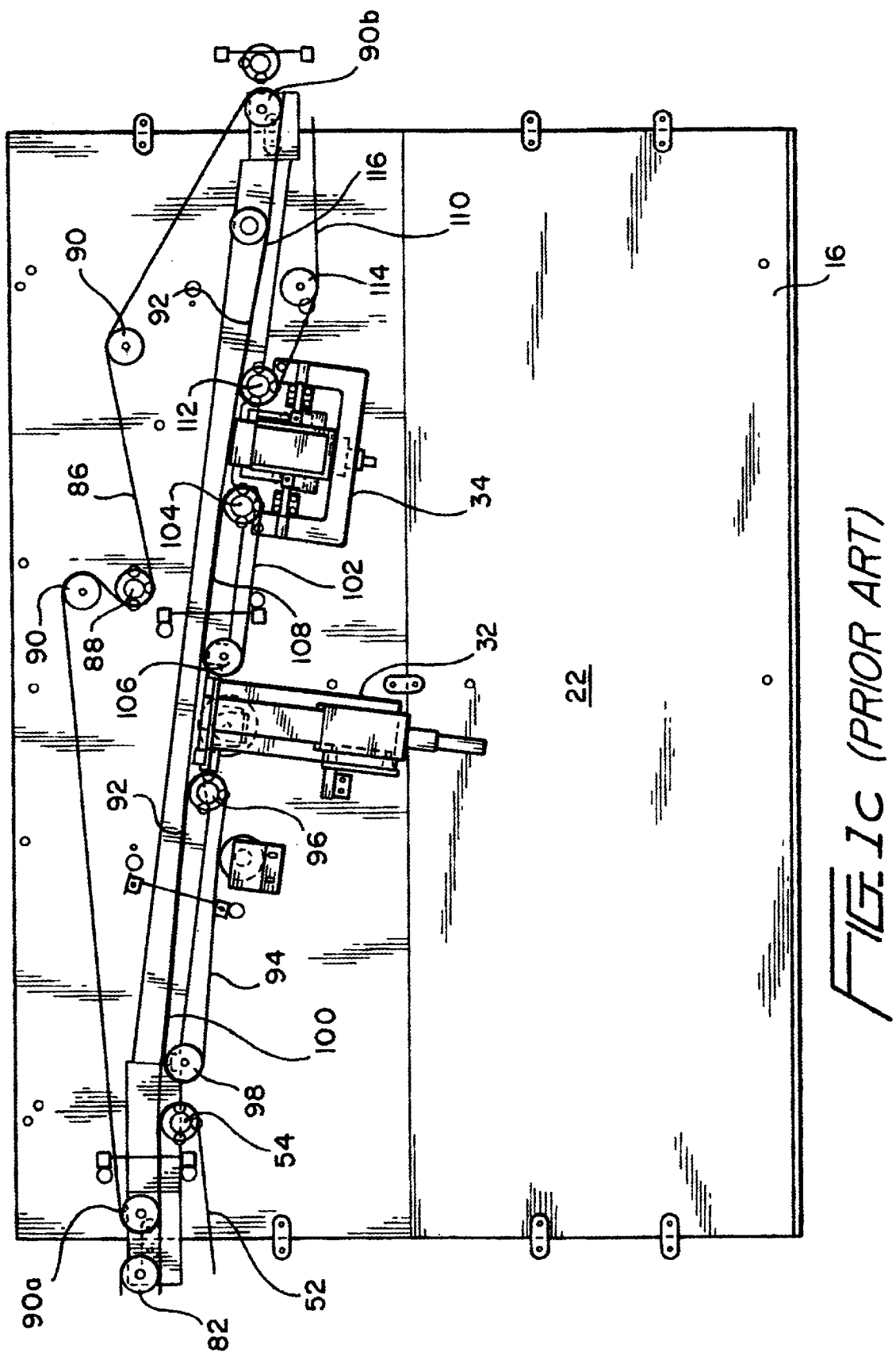
FIG. 1c is an enlarged detailed view of the third conveyor section of the PRIOR ART system disclosed within FIG. 1.

Referring now to the drawings, and more particularly to FIG. 2 thereof, a first embodiment of a new and improved mail or article conveyor system developed in accordance with the teachings and principles of the present invention, and showing the cooperative parts thereof, is disclosed and is generally indicated by the reference character 110. It is to be initially appreciated that the conveyor system 110 of the present invention is somewhat conceptually similar to the conventional or PRIOR ART conveyor system 10 as disclosed within FIGS. 1 and 1a–1c in that each one of the various conveyor stages or sections of the conveyor system 110 comprises a pair of oppositely disposed conveyor belts, however, the provision of such oppositely disposed conveyor belts within each conveyor stage or section comprises substantially the only major similarity between the systems.

Unlike the conventional or PRIOR ART conveyor system 10 disclosed within FIGS. 1 and 1a–1c, wherein a conveyor belt section would simply flex or bow in an attempt to accommodate pieces or units of mail, or similar articles, having relatively large thickness dimensions, in accordance with the principles and teachings of the present invention, portions of one of the oppositely disposed conveyor belts will move in accordance with spring-biased control mechanisms or devices such that the pieces or units of mail, or similar articles, having the relatively large thickness dimensions can in fact be accommodated. More particularly, the thickness dimension of the particular piece or unit of mail, or similar article, is virtually unlimited, or more accurately, is only limited by means of the stroke or arcuate movement of the spring-biased control mechanisms or devices, and is certainly not necessarily limited by means, or as a function, of the degree of flexure or stretchability of the conveyor belt per se.

With reference therefore being made to FIG. 2, there is shown, in effect, a first section or stage 112 of the conveyor system 110 of the present invention, it being of course appreciated that additional sections or stages of the conveyor system 110, although not illustrated, obviously comprise the overall conveyor system 110 and are located downstream of the illustrated conveyor stage or section 112. Pieces or units of mail, or similar articles, shown at 114, 116, are conveyed in a mail or article flow direction MF toward the first stage or section 112 of the conveyor system 110 by means of an upstream leveler conveyor stage or section, partially shown at 118, wherein units or pieces of mail, or similar articles, 114, 116 are simply preoriented in a substantially edgewise mode in preparation for high-speed conveyance downstream by means of the first conveyor section or stage 112 and the subsequent downstream conveyor stages or sections, not shown. It is also to be noted at this juncture that mail piece or article 114 has a relatively small thickness dimension, such as, for example, 0.007 inches, while mail piece or article 116 has a relatively large thickness dimension, such as, for example, 0.750 inches. In accordance with the principles and teachings of the present invention, and in order to continuously, rapidly, and reliably be capable of conveying or transporting various pieces or units of mail, or similar articles, having largely differing thickness dimensions, such as, for example, the pieces of mail, or articles, 114, 116, each conveyor section or stage, such as, first conveyor section or stage 112, comprises, in effect, a fixed conveyor side 120 and a movable conveyor side 122. The fixed conveyor side 120 comprises a conveyor belt 124 which is adapted to be driven by means of a drive pulley 126, operatively connected to a motor drive, not shown, and which is adapted to be routed around a plurality of longitudinally spaced idler pulleys 128. The axles of the drive pulley 126 and the idler pulleys 128, which are disposed upon the fixed side 120 of the conveyor section or stage 112, are fixed along a linear locus, and in this manner, the inner run 130 of the conveyor belt 124 defines a first planar portion of the mail or article conveyor flow path.

In a similar manner, it is seen that the movable conveyor side 122 comprises a conveyor belt 132 which is adapted to be driven by means of a drive pulley 134, also operatively connected to a motor drive, not shown, and which is adapted to be routed around a plurality of idler pulleys 136. Unlike the pulleys 128 disposed upon the fixed side 120 of the conveyor section 112, however, the idler pulleys 136 disposed upon the movable side 122 of the conveyor section 112 are movably mounted upon spring-biased plunger assemblies 138, the particular structure of which will be described in detail shortly hereafter. In this manner, the inner run 140 of the conveyor belt 132 is disposed opposite the inner run 130 of the conveyor belt 124 so as to cooperate with inner run 130 of conveyor belt 124 in defining the mail or article flow path, however, as a result of the provision of the movable idler pulleys 136, movably mounted upon the plunger assemblies 138, separate longitudinally spaced sections or regions of the inner run 140 of the conveyor belt 132 are separately or independently movable toward and away from the fixed inner run 130 of the conveyor belt 124 so as to readily make room for and thereby accommodate different units or pieces of mail, or similar articles, such as, for example, the articles 114, 116, having differing thickness dimensions. An additional idler pulley 142 may also be provided within an outer corner region of the conveyor belt 132, and a movable dancer roller 144 is disposed in contact with an external surface portion of the conveyor belt 132. The dancer roller 144 serves to maintain a proper or predetermined amount of tension or degree of tautness within the conveyor belt 132 as particular ones of the movable idler pulleys 136 move toward and away from the plane of the mail or article flow path when accommodating different pieces or units of mail, or similar articles, having different thickness dimensions. It is also noted that a plunger assembly 143, similar to the plunger assemblies 138, is disposed upon the fixed side 120 of the conveyor system 110 and at the entry to the conveyor system 110 so as to cooperate with a drive pulley 145 of a leveler system 147 which simply serves to preorient the articles being conveyed and to ensure that the articles are disposed upon the base or deck member defing the fixed and movable sides 120, 122 of the conveyor system 110.

It is therefore apparent that, as a result of the particular structure of the conveyor system 110, developed or implemented in accordance with the principles and teachings of the present invention, units or pieces of mail, or similar articles, having relatively large thickness dimensions no longer present any substantial difficulties in being continuously, rapidly, and reliably conveyed or transported within a handling, transporting, and sorting system because the range of articles or packages, as determined by means of their thickness dimensions, is virtually unlimited in that the maximum limit of the thickness dimensions of the particular articles or packages to be conveyed would be determined, in effect, by means of the stroke or travel of the idler pulleys 136 with respect to, and as permitted by, the respective plunger assemblies 138, which may, of course, in turn, be altered or adjusted as may be necessary or desirable within a particular conveyor system. It is additionally noted that for the system 110 to be operative, the plunger assemblies 138 and their operatively associated idler pulleys can either be disposed in direct opposition to the idler pulleys or rollers 128 on the fixed side 120 of the system 110, or alternatively, the plunger assemblies 138 and the idler pulleys or rollers 136 can be disposed or positioned at locations interposed between adjacent ones of the idler pulleys or rollers 128, or still yet further, the idler pulleys or rollers 128 can be disposed or positioned at locations interposed between adjacent ones of the idler pulleys or rollers 136. As was the case with the conveyor system 10 shown in FIGS. 1 and 1a–1c, the conveyor system 110 can likewise include a reader component, a printer, or a verifier which is disposed upon the fixed side 120 of the conveyor system 110 and is illustrated at 146.

With reference now being made to FIGS. 3–8, a description of the plunger assembly 138, utilized within the conveyor system 110, will now be described in detail such that the operative movements thereof for controlling the disposition of the movable inner run 140 of the conveyor belt 132, with respect to the relatively fixed inner run 130 of the conveyor belt 124, will be better understood. More particularly, each plunger assembly 138 is seen to comprise a plunger body 148 within which there is provided a first axially extending bore 150 having a relatively large diametricall extent, and a second axially extending bore 152 having a relatively small diametrical extent, as best seen in FIGS. 3–5. A stud member 154 is illustrated in detail in FIG. 6, and a plunger head component 156 is illustrated in detail in FIG. 7. The stud member 154 is seen to comprise a body section 158, and an externally threaded shank portion 160 is integrally provided upon one end of the body section 158, while a flanged portion 162 is integrally formed upon the opposite end of the body section 158.

An annular shoulder portion 164 is formed within the plunger body 148 at the intersection or interface defined between the large and small diameter bores 150, 152, and in this manner, when the stud member 154 is disposed within the plunger body 148, the flanged portion 162 of the stud member 154 will normally be disposed in contact with and seated upon the annular shoulder portion 164 of the plunger body 148 while the body section 158 of the stud member 154 projects outwardly from the plunger body 148 through small diameter bore 152 as best seen in FIG. 3. In order to achieve such an assembled structure, the upper end portions of front and rear wall members 166, 168 are respectively provided with bores 170, 172 as best seen in FIG. 5, and a plug member 174 is adapted to be fixedly secured within the open end of large diameter bore 150 of the plunger body 148 by means of a suitable fastener, not shown, which is inserted through the bores 170, 172 formed within the plunger body wall members 166, 168 as well as within a through-bore, not shown, formed within the plug member 174. A coil spring 176 is adapted to be inserted within the large diameter bore 150 of the plunger body 148 so as to be interposed between the plug member 174 and the flanged portion 162 of the stud member 154, and in this manner, the stud member 154 is constantly spring-biased toward its lower position as illustrated within FIG. 3 so as to be normally seated upon the annular shoulder portion 164 of the plunger body 148. It can thus be appreciated that the plunger body 148 and stud member 154 form, in effect, a piston-cylinder assembly whereby stud member 154 can move axially within and with respect to the plunger body 148 as determined by means of the spring bias of the coil spring 176.

As best seen in FIG. 7, the plunger head 156 is provided with an internally threaded axial bore 178 which is adapted to threadedly receive the externally threaded shank portion 160 of the stud member 154. In order to facilitate the threaded assembly of the threaded shank portion 160 of the stud member 154 within the threaded bore 178 of the plunger head 156, the flanged portion 162 of the stud member 154 is provided with a recess or blind bore 180 which has the configuration of a hexagon so as to define a hex-drive within which a suitable hex-drive tool, not shown, can be inserted so as to rotatably drive the stud member 154 in order to threadedly engage the same within the threaded bore 178 of the plunger head 156. In forming the plunger assembly 138, it is to be noted that the stud member 154 is initially inserted through the bores 150, 152 of the plunger body 148, and subsequently, the subassembly comprising the plunger head 156 and the stud member 154 is formed by means of the aforenoted threaded engagement between the member 154 and the head 156. Subsequently, the coil spring 176 can be inserted into the plunger body bore 150, and the plug member 174 secured within the open end of the bore 150. As can be additionally appreciated from FIGS. 3 and 4, the plunger body 148 is also provided with a pair of through-bores 182, 182 for receiving suitable fasteners, not shown, by means of which the plunger body 148, and therefore the entire plunger assembly 138, can be fixedly mounted upon the deck or base which forms the movable side 122 of the conveyor system 110.

With reference now being made to FIGS. 3, 7, and 8, the remaining structure forming the plunger assembly 138 will now be described. As seen in FIG. 7, the plunger head 156 is seen to further comprise a threaded bore 184 within which a threaded stud, not shown, is to be threadedly engaged. Such threaded stud, not shown, is operatively associated with the idler pulley or roller 136, through means of a suitable intermediary bearing assembly, also not shown, by means of which the idler pulley or roller 136 is rotatably secured and mounted upon a first side of the plunger head 156. As further seen in FIG. 7, the plunger head 156 also has formed therein a pair of bores 186, 186. In a similar manner, and as seen in FIG. 8, a pair of corresponding bores 188, 188 are provided within a slider member 190. Accordingly, the slider member 190 can be fixedly secured to, or mounted upon, a second side of the plunger head 156, which is opposite to the first side of the plunger head 156 upon which the idler pulley or roller 136 is mounted, by means of suitable fasteners, not shown, which are adapted to be disposed or engaged within the apertures or bores 188, 188 of the slider member 190 as well as within the bores 186, 186 of the plunger head 156. It may thus be readily appreciated that as a result of the structural arrangement of the various aforenoted components comprising the overall plunger assembly 138, each idler pulley or roller 136 is able to move relative to the plunger body 148, and in particular with respect to the base or deck 122 comprising the movable side of the conveyor system 110, so as to facilitate the movement of the inner run 140 of the conveyor belt 132. In order to provide for the smooth movement of the idler pulley or roller 136 member with respect to the base or deck 122 comprising the movable side of the conveyor system 110, the slider member 190 is slidably disposed upon the base or deck 122 and is formed from a suitable substantially low-friction or frictionless material such as, for example, ultra-high molecular weight polyethylene (UHMWPE), polytetrafluoroethylene (TEFLON®), NYLON®, or the like.

With reference lastly being made to FIG. 9, a second embodiment of a new and improved mail or article conveyor system developed in accordance with the teachings and principles of the present invention, and showing the cooperative parts thereof, is disclosed and is generally indicated by the reference character 210. It is to be noted that components parts of the conveyor system 210 which correspond to those component parts of the conveyor system 110 shown in FIG. 2 are designated by means of corresponding reference characters except that the reference characters will be within the 200 series. More particularly, it is seen that the conveyor system 210 comprises a fixed side 220 which comprises a drive pulley 226 for driving a conveyor belt 224 and a plurality of idler pulleys 228 around which the conveyor belt 224 is routed so as to present an inner conveyor belt run 230 along the mail or article flow path. In a similar manner, a movable side 222 of the conveyor system 210 is seen to comprise a conveyor belt 232 which is driven by means of a drive pulley 234 and which is routed around a plurality of idler pulleys 236 which are operatively associated with spring plunger assemblies 238. A remote idler pulley is also disclosed at 242, and a dancer roller 244 is also provided in conjunction with the conveyor belt 232, and as a result of such structural arrangement, an inner run or section 240 of the conveyor belt 232 is disposed along the mail or article flow path in opposed cooperation with the inner run or section of conveyor belt 230.

As can be readily appreciated, the primary difference between the conveyor system 210 disclosed within FIG. 9 and conveyor system 110 disclosed within FIG. 2 resides in the fact that in lieu of some of the idler pulleys 136 and spring plunger assemblies 138, the conveyor system 210 comprises a plurality of idler wheels 296 which are respectively mounted upon a plurality of spring arm members 292. More particularly, the spring arm members 292 are pivotally mounted upon the base or deck which defines movable side 222 of the conveyor system 210, and torsion springs, not shown, are operatively associated with the spring arm members 292 so as to normally bias the spring arm members 292 in clockwise directions whereby the idler wheels 296 are biased into contact with interior surfaces of the conveyor belt 232 so as to maintain the inner run 240 of the conveyor belt 232 disposed along the mail or article flow path. It can thus be further appreciated that in a manner similar to the provision of the plurality of idler pulleys 136, the pivotal or arcuate movement of the spring arm members 292, and their associated idler wheels 2965, permits separate and independent sections of the inner run 240 of the conveyor belt 232 to be moved away from the plane of the mail or article flow path so as to in fact be capable of accommodating various pieces or units of mail, or similar articles, which may have relatively large thick-ness dimensions. In addition, as was the case with the idler pulleys 136 and spring plunger assemblies 138, and similarly in connection with the idler pulleys 236 and spring plunger assemblies 238, the range of arcuate movement of the spring arm members 292 and their associated idler wheels 296, which defines the degree to which the idler wheels 296 can be moved backwardly or retracted away from the plane of the mail or article flow path, is the only parameter which significantly limits the thickness dimension of the pieces or units of mail, or similar articles, which can be accommodated by means of the conveyor system 210. It is also noted that in accordance with the conveyor system 210, the plurality of idler wheels 296 disposed upon the movable side of the conveyor system 210 are disposed directly opposite corresponding ones of the fixed idler pulleys 228 disposed upon the fixed side 220 of the conveyor system 210.

Thus, it may be seen that in accordance with the principles and teachings of the present invention, there has been developed a new and improved mail or article conveyor system which comprises a fixed side which is defined by means of a plurality of idler pulleys which have their axes fixed with respect to the plane of the mail or article flow path, and a movable side which is defined by means of a plurality of idler pulleys and idler wheels which are movable with respect to the plane of the mail or article flow path so as to in fact be capable of independently moving away from the mail or article flow path thereby accommodating different pieces or units of mail, or simmilar articles, having different, and in particular, relatively large, thickness dimensions.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A conveyor system for conveying articles having different thickness dimensions, comprising:

a first fixed side conveyor subsystem comprising a first conveyor belt routed around a first set of pulleys so as to define a first inner run section disposed along an article flow path, said first set of pulleys being rotatable around axes which are fixed with respect to said article flow path;

a second movable side conveyor subsystem comprising a second conveyor belt routed around a second set of pulleys so as to define a second inner run section disposed along said article flow path and opposite said first inner run section of said first conveyor belt so as to cooperate with said first inner run section of said first conveyor belt for conveying articles along said article flow path; and a plurality of spring-biased plunger assemblies upon which said second set of pulleys are respectively mounted such that said second set of pulleys are rotatable around axes which, are movable with respect to said article flow path wherein, said conveyor system can accommodate the conveyance of articles having different thickness dimensions, each one of said spring-biased plunger assemblies comprising a plunger body; an axial bore defined within said plunger body; a spring member disposed within said axial bore defined within said plunger body; and a plunger stud member, defining a longitudinal axis, having a first end portion disposed within said axial bore defined within said plunger body so as to be disposed in contact with said spring member disposed within said axial bore defined within said plunger body, and a second end portion upon which each one of said second set of pulleys is mounted whereby each one of said second set of pulleys is movably mounted with respect to said article flow path as a result of said plunger stud member moving axially within said axial bore defined within said plunger body against the biasing force of said spring member.

2. The system as set forth in claim wherein each one of said spring-biased plunger assemblies further comprises:

a plug member disposed within said axial bore defined within said plunger body such that each one of said spring members disposed within said axial bore of said plunger body is interposed between said plug member and said second end portion of said plunger stud member.

3. The system as set forth in claim 1, wherein:

said movable side of said conveyor system comprises a deck upon which said spring-biased plunger assemblies are fixedly mounted.

4. The system as set forth in claim 3, wherein:

each one of said plunger bodies is fixedly mounted upon said deck;

said second end portion of each plunger stud member projects outwardly from said plunger body; and each one of said spring members disposed within said plunger body biases said plunger stud member in an outward direction with respect to said plunger body so as to bias said respective one of said second set of pulleys into engagement with said second inner run section of said second conveyor belt.

5. The system as set forth in claim 4, wherein each one of said spring-biased plunger assemblies further comprises:

a plunger head upon which each one of said second end portions of said plunger stud members is mounted; and each one of said second set of pulleys is mounted upon said plunger head.

6. The system as pet forth in claim 5, wherein:

each one of said second set of pulleys is mounted upon a first side of said plunger head; and a slider member is mounted upon a second opposite side of said plunger head so as to facilitate slidable movement of each one of said second set of pulleys upon said deck when each one of said second set of pulleys is moved with respect to said article flow path in order to accommodate the conveyance of articles having different thickness dimensions.

7. The system as set forth in claim 6, wherein:

said slider member is fabricated from a material which is selected from the group of materials comprising ultra-high molecular weight polyethylene (UHMWPE), polytetrafluorothylene (TEFLON®), and NYLON®.

8. The system as set forth in claim 1, wherein:

said second set of pulleys disposed upon said movable side of said conveyor system are disposed directly opposite said first set of pulleys disposed upon said fixed side of said conveyor system.

9. The system as set forth in claim 1, wherein:

said second set of pulleys disposed upon said movable side of said conveyor system are disposed at locations along said article flow path which are longitudinally offset with respect to locations along said article flow path at which said first set of pulleys disposed upon said fixed side of said conveyor system are disposed.

10. The system as set forth in claim 1, further comprising:

a third set of pulleys respectively mounted upon pivotally movable spring-biased swing arms.

11. A conveyor system for conveying articles having different thickness dimensions, comprising:

a first fixed side conveyor subsystem comprising a first conveyor belt routed around a first set of pulleys so as to define a first inner run section disposed along an article flow path, said first set of pulleys being rotatable around axes which are fixed with respect to said article flow path;

a second movable side conveyor subsystem comprising a second conveyor belt routed around a second set of pulleys so as to define a second inner run section disposed along said article flow path and opposite said first inner run section of said first conveyor belt so as to cooperate with said first inner run section of said first conveyor belt for conveying articles along said article flow path; and a plurality of spring-biased plunger assemblies upon which said second set of pulleys are respectively mounted such that said second set of pulleys are rotatable around axes which are movable toward and away from said article flow path in response to the conveyance of articles, having different thickness dimensions, along said article flow path wherein said conveyor system can accommodate the conveyance of articles having different thickness dimensions, each one of said spring-biased plunger assemblies comprising a plunger body; an axial bore defined within said plunger body; a spring member disposed within said axial bore defined within said plunger body; and a plunger stud member, defining a longitudinal axis, having a first end portion disposed within said axial bore defined within said plunger body so as to be disposed in contact with said spring member disposed within said axial bore defined within said plunger body, and a second end portion upon which each one of said second set of pulleys is mounted whereby each one of said second set of pulleys is movably mounted with respect to said article flow path as a result of said plunger stud member moving axially within said axial bore defined within said plunger body against the biasing force of said spring member.

12. The system as set forth in claim 11, wherein each one of said spring-biased plunger assemblies further comprises:

a plug member disposed within said axial bore defined within said plunger body such that each one of said spring members disposed within said axial bore of said plunger body is interposed between said plug member and said second end portion of said plunger stud member.

13. The system as set forth in claim 11, wherein:

said movable side of said conveyor system comprises a deck upon which said spring-biased plunger assemblies are fixedly mounted.

14. The system as set forth in claim 13, wherein:

each one of said plunger bodies is fixedly mounted upon said deck;

said second end portion of each plunger stud member projects outwardly from said plunger body; and each one of said spring members disposed with-in said plunger body biases said plunger stud member in an outward direction with respect to said plunger body so as to bias said respective one of said second set of pulleys into engagement with said second inner run section of said second conveyor belt.

15. The system as set forth in claim 14, wherein each one of said spring-biased plunger assemblies further comprises:

a plunger head upon which each one of said second end portions of said plunger stud members is mounted; and each one of said second set of pulleys is mounted upon said plunger head.

16. The system as set forth in claim 15, wherein:

each one of said second set of pulleys is mounted upon a first side of said plunger head; and a slider member is mounted upon a second opposite side of said plunger head so as to facilitate slidable movement of each one of said second set of pulleys upon said deck when each one of said second set of pulleys is moved with respect to paid article flow path in order to accommodate the conveyance of articles having different thickness dimensions.

17. The system as set forth in claim 16, wherein:

said slider member is fabricated from a material which is selected from the group of materials comprising ultra-high molecular weight polyethylene (UHMWPE), polytetrafluorothylene (TEFLON®), and NYLON®.

18. The system as set forth in claim 11, wherein:

said second set of pulleys disposed upon said movable side of said conveyor system are disposed directly opposite said first set of pulleys disposed upon said fixed side of said conveyor system.

19. The system as set forth in claim 11, wherein:

said second set of pulleys disposed upon said movable side of said conveyor system are disposed at locations along said article flow path which are longitudinally offset with respect to locations along said article flow path at which said first set of pulleys disposed upon said fixed side of said conveyor system are disposed.

20. The system as set forth in claim 11, further comprising:

a third set of pulleys respectively mounted upon pivotally movable spring-biased swing arms.

* * * * *